United States Patent
Kabbes et al.

(10) Patent No.: US 12,337,336 B2
(45) Date of Patent: Jun. 24, 2025

(54) SHAFT MOUNTED CENTRIFUGAL AIR-OIL SEPARATOR SYSTEM

(71) Applicant: Rolls-Royce North American Technologies Inc., Indianapolis, IN (US)

(72) Inventors: Michael Kabbes, Indianapolis, IN (US); Jacob Harral, Indianapolis, IN (US); Michael Dornfeld, Indianapolis, IN (US); Kenneth Miller, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 78 days.

(21) Appl. No.: 18/323,217

(22) Filed: May 24, 2023

(65) Prior Publication Data

US 2024/0390919 A1   Nov. 28, 2024

(51) Int. Cl.
| | | |
|---|---|---|
| *F02C 7/05* | (2006.01) | |
| *B01D 45/14* | (2006.01) | |
| *B04B 5/00* | (2006.01) | |
| *B04B 5/08* | (2006.01) | |
| *B04B 9/08* | (2006.01) | |

(52) U.S. Cl.
CPC ............... *B04B 9/08* (2013.01); *B01D 45/14* (2013.01); *B04B 5/005* (2013.01); *B04B 5/08* (2013.01); *F02C 7/05* (2013.01)

(58) Field of Classification Search
CPC .. B04B 9/08; B04B 5/005; B04B 5/08; B01D 45/12; B01D 45/14; F02C 7/05
See application file for complete search history.

(56) References Cited

U.S. PATENT DOCUMENTS

| | | | |
|---|---|---|---|
| 4,217,120 | A | 8/1980 | Reynolds |
| 6,033,450 | A | 3/2000 | Krul et al. |
| 2005/0217272 | A1 | 10/2005 | Sheridan et al. |
| 2010/0107687 | A1* | 5/2010 | Andrian .......... C10L 3/10 62/620 |
| 2018/0140984 | A1* | 5/2018 | Janssen .......... B01D 45/14 |

(Continued)

FOREIGN PATENT DOCUMENTS

| | | |
|---|---|---|
| CN | 105863847 A | 8/2016 |
| EP | 3135882 A1 | 3/2017 |
| FR | 3064305 A1 | 9/2018 |

(Continued)

OTHER PUBLICATIONS

Extended EP Search Report datedJun. 18, 2024 and issued in connection with EP Appln. No. 24160832.2, 12 pgs.

*Primary Examiner* — Steven M Sutherland
(74) *Attorney, Agent, or Firm* — Barnes & Thornburg

(57) ABSTRACT

A centrifugal air-oil separator system for a gas turbine engine system is described. The air-oil separator system has a rotatable shaft and the shaft includes an axially extending bore formed at least partially through the shaft. A gear is integral to or mounted on an outer surface of the shaft. The air-oil separator system also includes a bolt-on breather mounted on the shaft and independent from and in contiguous contact with the gear to assist in separating the oil from the air. Various types of materials may be utilized in the construction of the air-oil separator system.

19 Claims, 6 Drawing Sheets

(56) References Cited

U.S. PATENT DOCUMENTS

2020/0072126 A1    3/2020  Fulleringer et al.
2020/0222841 A1*   7/2020  Nifenecker ........... F16N 39/002

FOREIGN PATENT DOCUMENTS

GB          709646        6/1954
JP         4490553 B2     6/2010
WO    WO-2020221814 A1 *  11/2020  ............. B01D 45/14

* cited by examiner

SHAFT MOUNTED CENTRIFUGAL AIR-OIL SEPARATOR SYSTEM

TECHNICAL FIELD

This disclosure relates to air-oil separator systems in gas turbine engines and gearboxes and, in particular, to a shaft mounted centrifugal air-oil separator system.

BACKGROUND

Air-oil separator systems are used in gas turbine engines to separate oil from the air in the interior of a transmission or gearbox to reduce oil consumption, lower emissions, and keep the engine operating efficiently. An improved, weight saving air-oil separator system would be advantageous.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

As lubricating oil is introduced into a gearbox or bearing sump during gas turbine engine operation, windage results in the oil being entrained in the air. To reduce oil consumption and churning in a gearbox or bearing sump, it is important to separate this oil from the air. Physical interaction with a shaft mounted air-oil separator system (also known as a breather) may help coalesce the finely dispersed oil particles into larger droplets. Because liquid oil is heavier than air, the oil may be separated out and forces, such as centrifugal forces, may be used to help drive the oil toward the outside of the structure where the oil may be returned to an oil reservoir in the engine. The air separated from the oil may be vented through the air-oil separator structure and out to the atmosphere. By way of an introductory example, a centrifugal air-oil separator system for a gas turbine engine system has a rotatable shaft and the shaft includes an axially extending bore formed at least partially through the shaft. A gear is integral to or mounted on an outer surface of the shaft. The air-oil separator system also includes a bolt-on breather having a first part and/or a second part, each of the first part and/or the second part positioned to mount on the shaft and be contiguously coupled with the gear to assist in separating the oil from the air. As used herein, the term "bolt-on" refers to an accessory that can be fastened or attached onto a component. Various types of materials may be utilized in the construction of the air-oil separator system.

Figure 1:
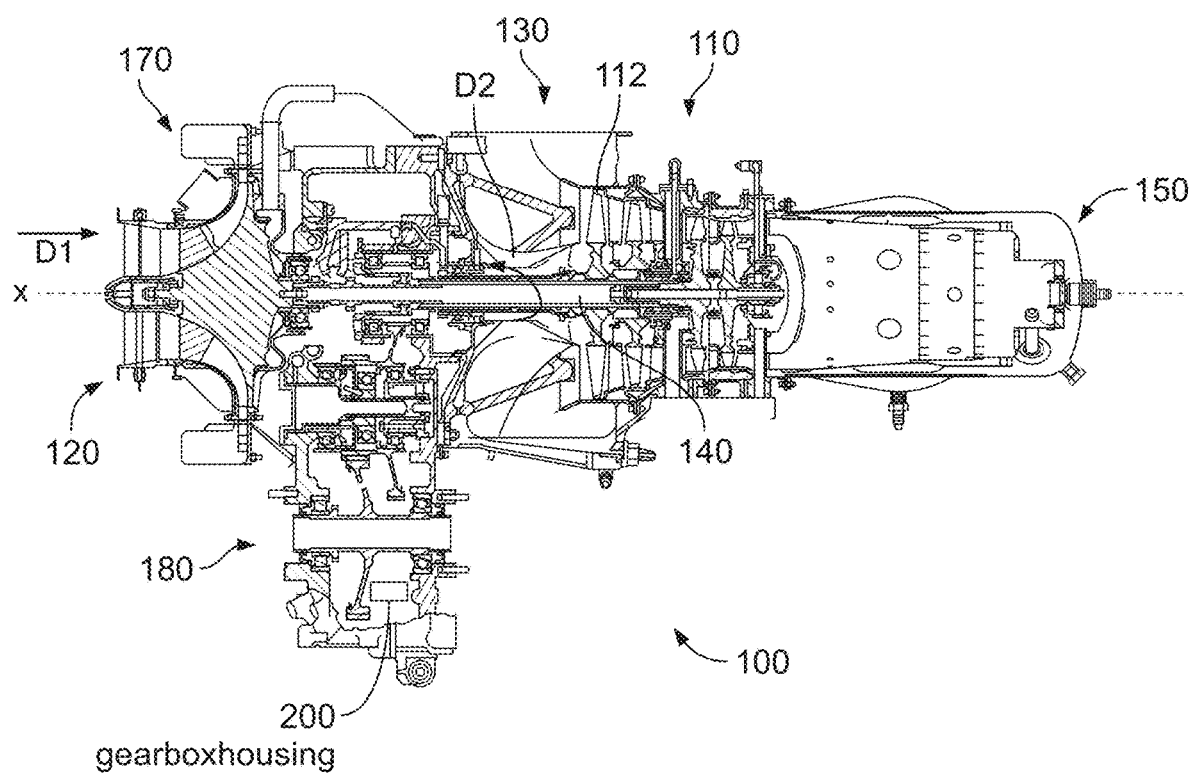
FIG. 1 is a cross-sectional view of an example gas turbine engine system.

In connection with the centrifugal air-oil separator system, FIG. 1 is a cross-sectional view of a gas turbine engine system 100. In some examples, the gas turbine engine system 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. In addition, the gas turbine engine system 100 may be utilized in a configuration unrelated to an aircraft such as, but not limited to, an industrial application, an energy application, a power plant, a pumping set, a marine application (for example, for naval propulsion), a weapon system, a security system, a perimeter defense or security system.

The gas turbine engine system 100 may take a variety of forms in various embodiments. Though depicted as a two-spool engine having a centrifugal compressor and axial flow gas generator and power turbine stages, in some forms the gas turbine engine system 100 may have one or multiple spools and/or may be any form of axial flow engine or mixed centrifugal/axial flow engine. In some forms, the gas turbine engine system 100 may be a turboprop, a turbofan, a turboshaft engine, APU, or a generator set, or other turbomachinery applications. Furthermore, the gas turbine engine system 100 may be an adaptive cycle and/or variable cycle engine. Other variations are also contemplated.

The gas turbine engine system 100 may include an intake section 120, a compressor section 170, a combustion section 150, a turbine section 110, and an exhaust section 130. During operation of the gas turbine engine system 100, fluid received from the intake section 120, such as air, travels along the direction D1 and may be compressed within the compressor section 170. The compressed fluid may then be mixed with fuel and the mixture may be burned in the combustion section 150. The combustion section 150 may include any suitable fuel injection and combustion mechanisms. The hot, high pressure fluid may then pass through the turbine section 110 to extract energy from the fluid and cause a turbine shaft 140 to rotate, which in turn drives the compressor section 170. Discharge fluid may exit the exhaust section 130.

As noted above, the hot, high pressure fluid passes through the turbine section 110 during operation of the gas turbine engine system 100. As the fluid flows through the turbines section 110, it causes the turbine rotors in turbine section 110 to rotate. The rotating turbines 112 may turn a shaft 140 in a rotational direction D2, for example. The blades 112 may rotate around an axis of rotation, which may correspond to a centerline X of the turbine 110 in some examples. In some examples, the gas turbine engine system 100 may include a power transfer 180 in the form of a transmission or gearbox. The power transfer 180 may extract energy from the engine output in the form of torque at an angular velocity, and transfer such energy to other components within an aircraft. In an example of a helicopter or airplane, the power transfer 180 may transfer energy extracted from the engine to one or more propulsors. As used herein, the term "propulsor" or "propulsors" is defined as a helicopter rotor, an airplane propeller, a ducted fan, or other mechanical device (such as, but not limited to, generators for electrical power generation) that is rotational driven by a motor to provide propulsion or work.

In one example, a centrifugal air-oil separator system 210 is situated inside a gear box housing 200 of the gas turbine engine system 100. In other examples, the centrifugal air-oil separator system 210 may be situated inside an oil system housing of a gas turbine engine sump.

Figure 2:
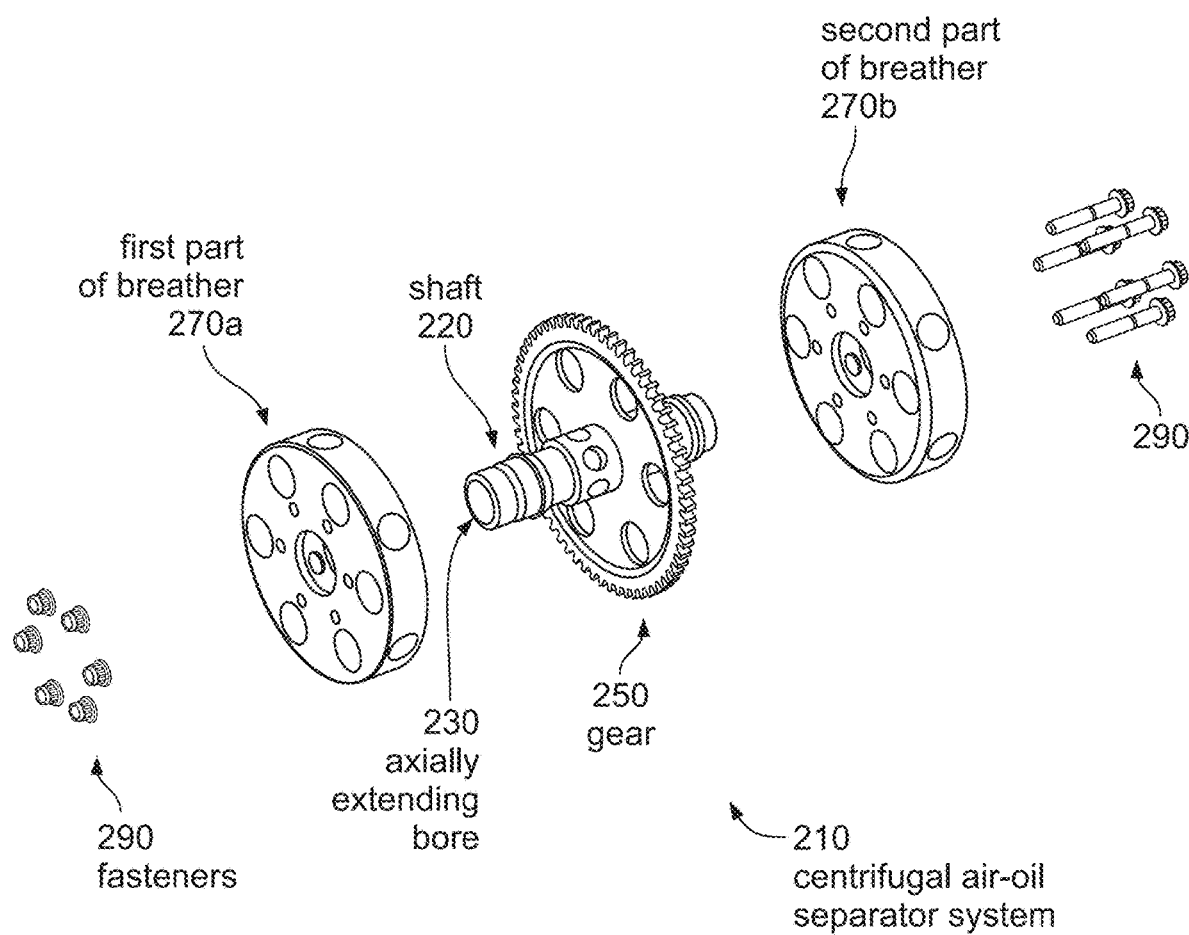
FIG. 2 is an exploded view of an example centrifugal air-oil separator system with a bolt-on breather.

FIG. 2 is an exploded view of an example centrifugal air-oil separator system 210. The centrifugal air-oil separator system 210 includes a gear 250, located on a rotatable shaft 220, and a bolt-on breather 270 having a first part 270a and/or a second part 270b, which may be joined together by fasteners 290. In some examples, the breather 270 may be a one-piece, in which the breather 270 consists of only the first part 270a or the second part 270b. The shaft 220 includes an axially extending bore 230 formed at least partially through the shaft 220 supporting the gear 250. The shaft 220 may be rotatable by a power takeoff from the gas turbine engine system 100, a shaft of the gas turbine engine system 100 or other rotatable component of the gas turbine engine system 100. The bolt-on breather 270 rotates in response to the rotation of the gear 250. As opposed to an integral design, each of the components, the breather 270, the gear 250, and the shaft 220 may be separately constructed and fitted together in various configurations. For example, the breather 270 may be mounted on the shaft 220 independent from and in contiguous contact with the gear 250. In some examples, the breather 270 may be bolted to the gear 250 independent from the shaft 220. In other examples, the breather 270 may be mounted on the shaft 220 without the gear 250 present.

Figure 3:
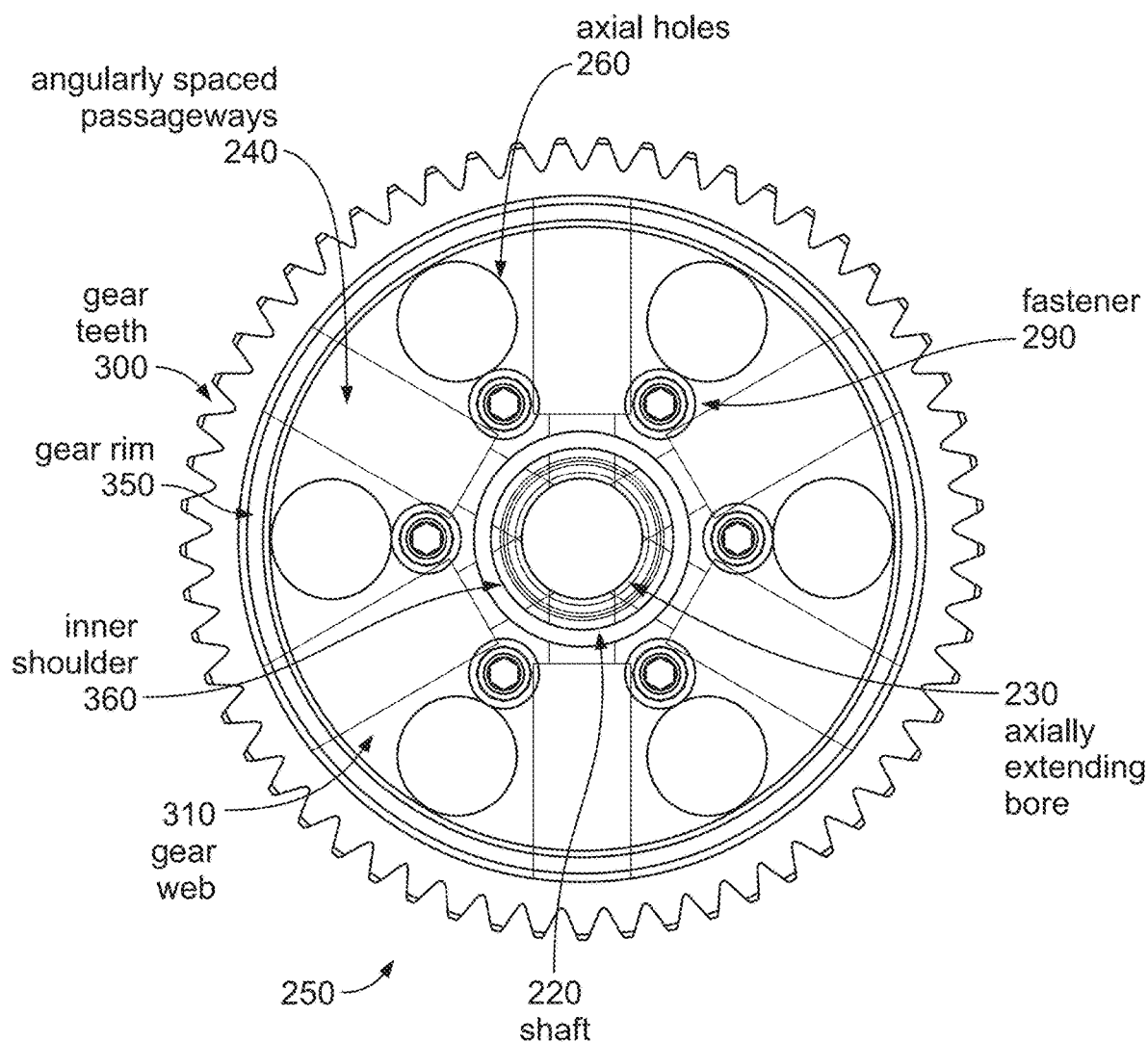
FIG. 3 is a cross-sectional view of an example gear shaft of a centrifugal air-oil separator system.

FIG. 3 illustrates a cross-sectional view of an example gear shaft in the air-oil separator system 210. In FIG. 3, a gear 250 is integral to or mounted on an outer surface of a shaft 220 and radially extending away from the shaft 220. The gear 250 includes gear teeth 300, a gear rim 350, and a gear web 310, which may include an inner shoulder 360. Optionally, the gear 250 may include a plurality of axial holes 260 spaced between a plurality of angularly spaced radial passageways 240 in the shaft 220. One purpose of including axial holes 260 in the gear 250 is to reduce weight of the gear 250. In some examples, the gear 250 may not include any axial holes 260.

Figure 4:
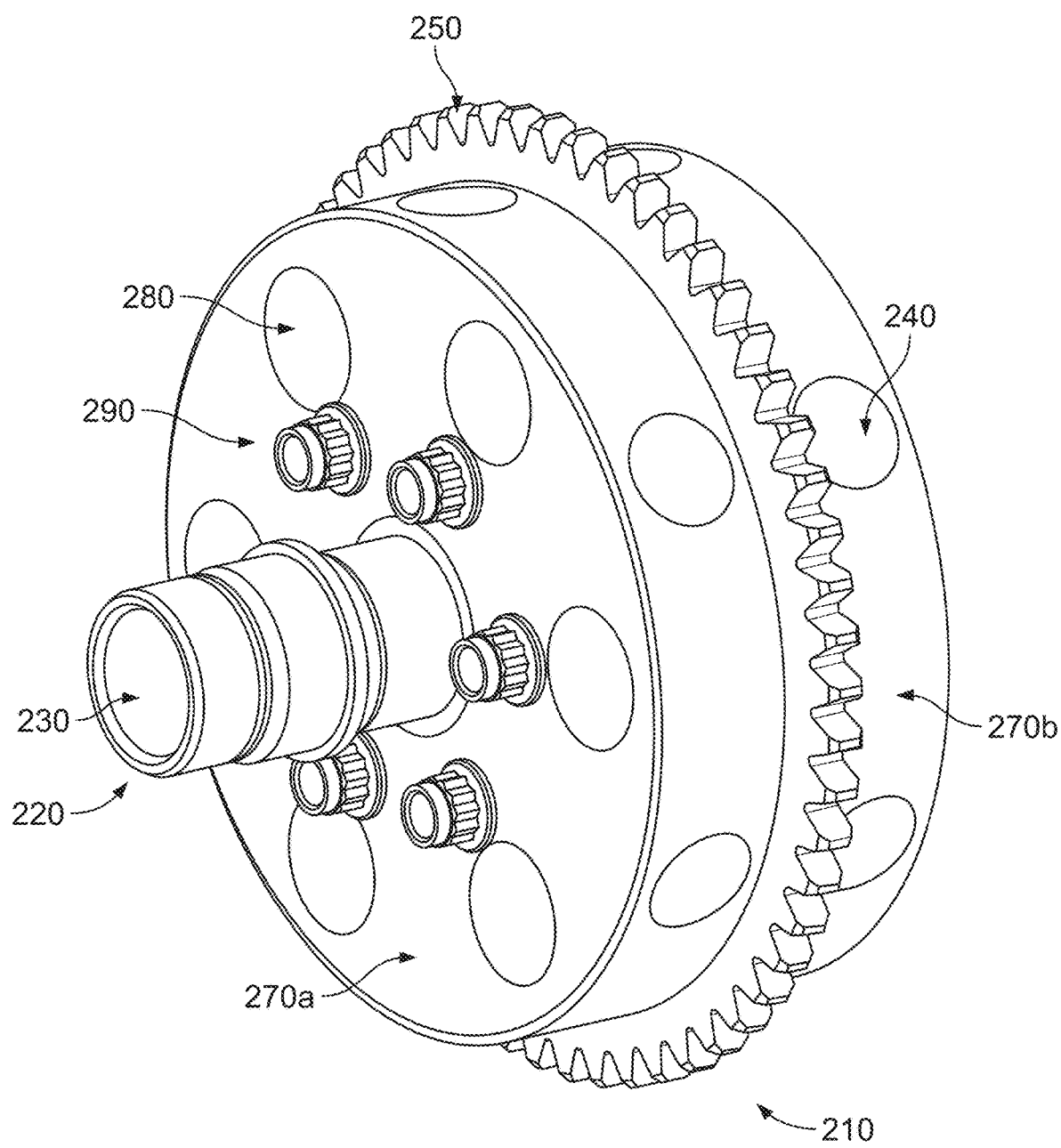
FIG. 4 is a perspective view of an example centrifugal air-oil separator system with a bolt-on breather.
Figure 5:
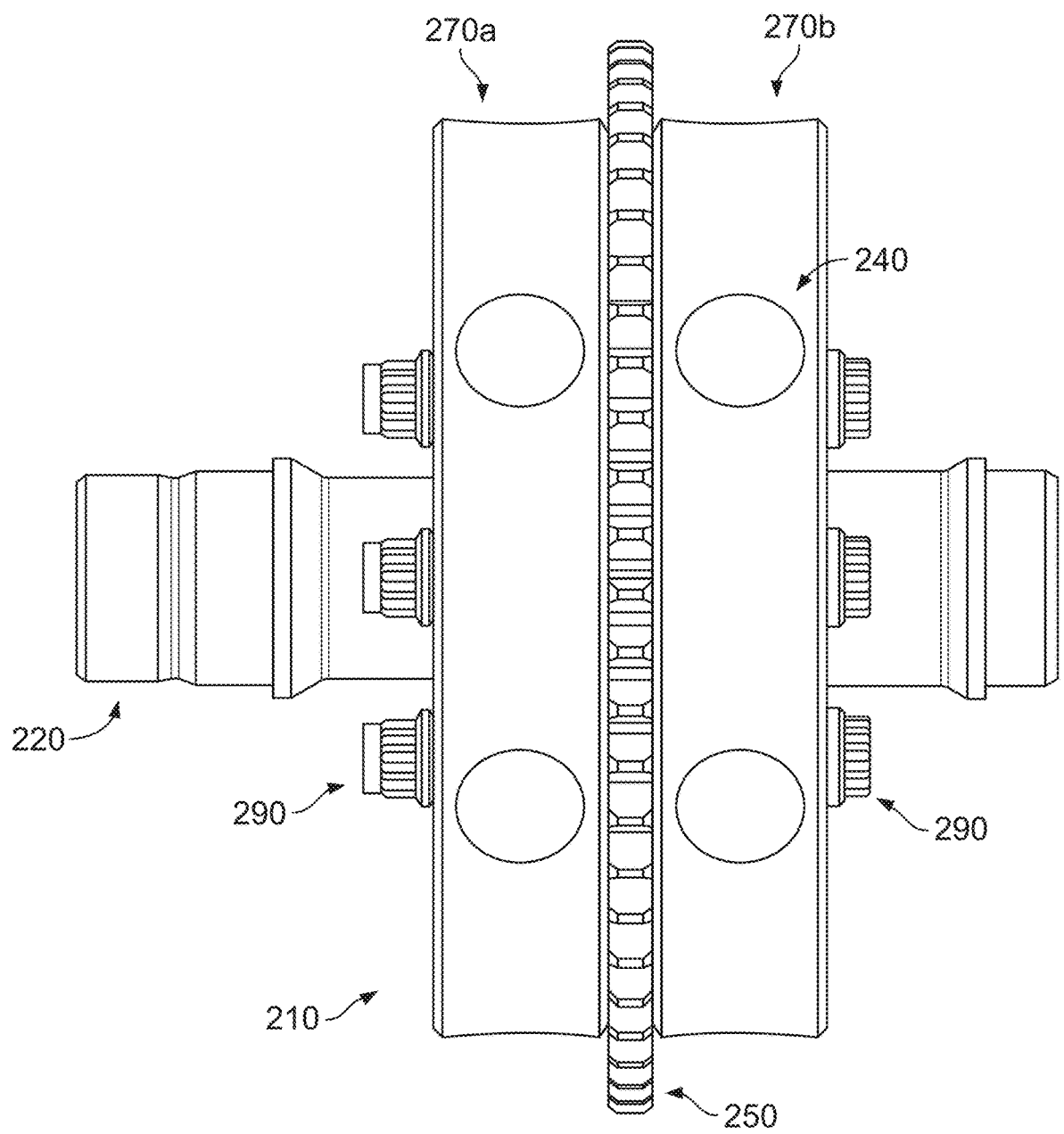
FIG. 5 is a side view of an example centrifugal air-oil separator system with a bolt-on breather.

FIG. 4 illustrates a perspective view of an example centrifugal air-oil separator system 210 with a bolt-on breather 270 having a first part 270a and a second part 270b. FIG. 5 is a side view of the centrifugal air-oil separator system 210 of FIG. 4. As shown in FIGS. 4 and 5, each of the first part 270a and the second part 270b are mounted on the shaft 220 and are contiguously coupled with opposite sides of the gear 250. For example, the first part 270a and the second part 270b are in contiguous contact with the gear web 310 (FIG. 3). In other examples, the first part 270a and the second part 270b are in contiguous contact with at least one of the gear inner shoulder 360 or the gear rim 350 (FIG. 3). In one example, the bolt-on breather 270 consists of the first part 270a or the second part 270b mounted on the shaft 220 and is in contiguous contact with at least one of the gear web 310, the gear inner shoulder 360, or the gear rim 350. In other examples, the first part 270a or the second part 270b is not mounted on the shaft 220 but is in contiguous contact with at least one of the gear web 310, the gear inner shoulder 360, or the gear rim 350.

Additionally, each of the first part 270a and/or the second part 270b may have a plurality of axial holes 280 that may align with the plurality of axial holes 260 on the gear 250. In other examples, the plurality of axial holes 280 are not aligned with the plurality of axial holes 260 on the gear 250. The first part 270a and/or the second part 270b extend radially outward from the shaft 220, independent of the predetermined radial distance of the gear 250. In the example shown in FIG. 4, the first part 270a and the second part 270b are illustrated as less than the predetermined radial distance of the gear 250.

In the examples, the first part 270a and/or the second part 270b of the breather 270 are contiguously coupled with the gear 250 by fasteners 290, such as threaded bolts and nuts, with the bolts extending through the first part 270a, the gear 250, and the second part 270b. In other examples, the fasteners 290 may be extended through one of the first and second parts 270a and/or 270b, incorporating threads in 270a or 270b to couple the parts. Alternatively, or in addition, the first part 270a and/or the second part 270b may be press-fit onto the shaft 220. Additionally, the first part 270a and/or the second part 270b are pressed into contiguous contact with the gear 250 in opposite directions by fasteners 290, which may further include at least one spanner nut, with the first part 270a and/or the second part 270b being held against the gear 250 by compression with the spanner nut. In the examples, any hardware that mechanically joins or affixes the breather 270 to the gear 250 may be used as fasteners. In general, the fasteners are used to create non-permanent joints; that is, joints that can be removed or dismantled without damaging the joining components (e.g., the first and second parts 270a and 270b). Examples of the fasteners 290 may be bolts, screws, nuts, grommets, rivets, studs, washers, rings, pins, spacers, clips, or ties, and combinations thereof. The fasteners 290 may be made of metal or plastic. In some examples, plastic snaps may be featured on the first and second parts 270a and 270b to engage with the shaft 220. Any number of fasteners 290 can be included, for example, four to eight fasteners are included. In one example, six sets of nuts and bolts are used. In some examples, O-ring seals, press fits or other sealing products may be incorporated to seal connections between the components. In one example, O-ring seals are used on the shaft 220 to seal the connections between the first and second parts 270a and 270b of the bolt-on breather 270 and the shaft 220. In other examples, O-ring seals are placed on the bolt-on breather 270 to accomplish sealing with the shaft 220. In other examples, O-ring seals may not be used and a press fit serves as the sealing function between the breather 270 and the shaft 220.

Figure 6:
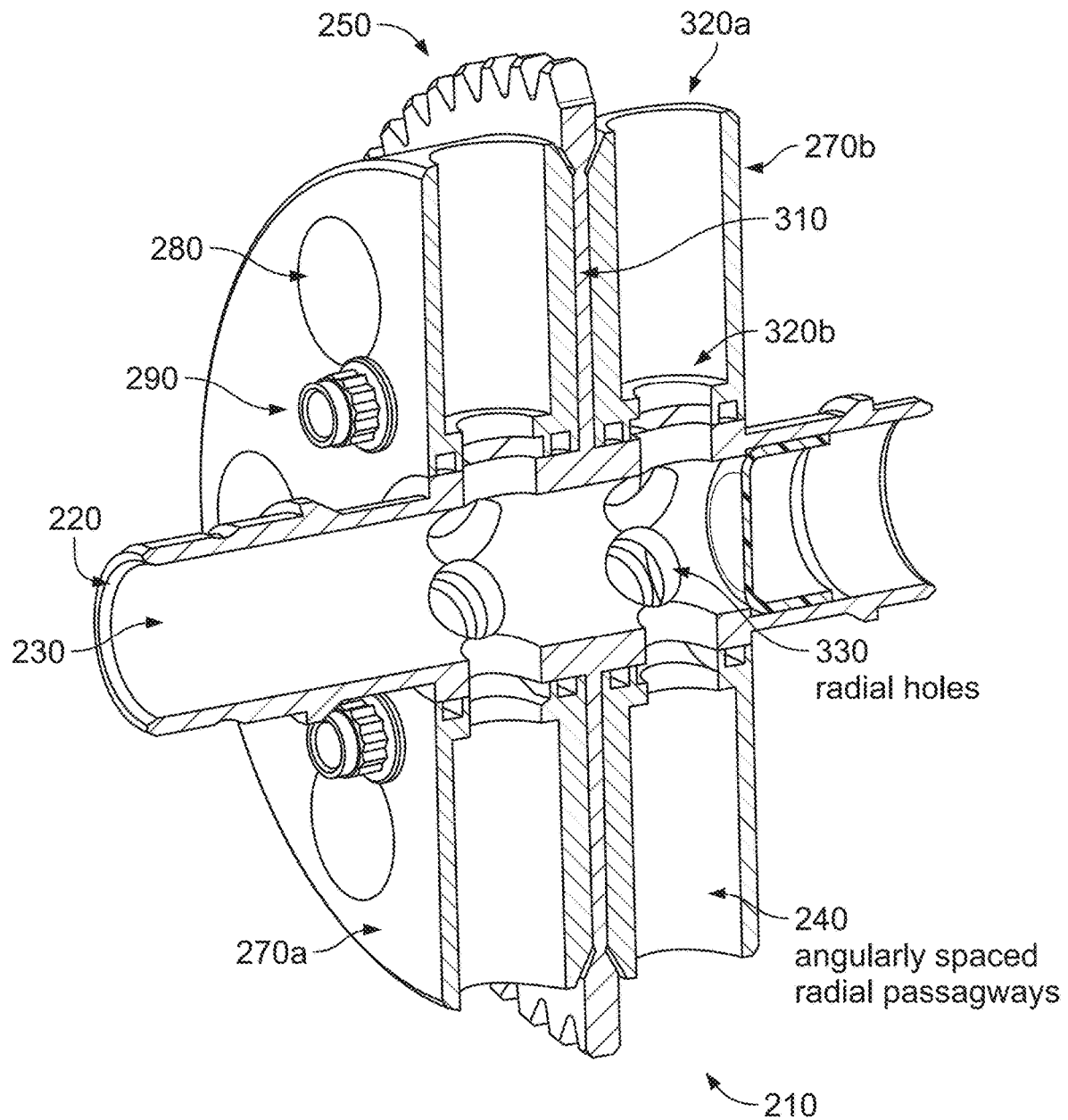
FIG. 6 is a sectional view of an example centrifugal air-oil separator system with a bolt-on breather.

FIG. 6 is a sectional view of the centrifugal air-oil separator system 210 of FIG. 4. As shown in FIG. 6, each of the first part 270a and the second part 270b of the bolt-on breather 270 may include a plurality of angularly spaced radial passageways 240 through a respective body of the first part 270a and the second part 270b to receive an air-oil mist from the engine, separating the oil from the air, and allow the air to enter the bore 230. The plurality of passageways 240 on the breather 270 extend radially outward and communicate with the cavity which opens to the bore 230 via a plurality of radial holes 330 in the shaft 220. In addition, the geometry of the passageways 240, such as the shape and size, may be adjusted to enhance the air and oil separation. The passageways 240 may be of any shape and size. In some examples, the passageways 240 have a shape different from a circular opening or any radial holes. The adjustments may be achieved by using manufacturing methods selected from, but not limited to, machining, casting, additive layer manufacturing (ALM), extrusion, pressing, or injection molding or another manufacturing method known in the art. In some examples, the breather 270 includes both the first part 270a and the second part 270b, and the passageways 240 in the first part 270a and the passageways 240 in the second part 270b provide fluid communication between the first part 270a and the second part 270b through the gear web 310. In other examples, the passageways 240 are not in communication between the first part 270a and the second part 270b.

In the example shown in FIG. 6, the radial holes 330 are cross-drilled into the shaft 220.

During operation, the air-oil separator system 210 utilizes the centrifugal forces generated by rotation of the gears 250 and the bolt-on breather 270 to extract oil from the air-oil mist collected inside the gearbox 180 and divert the extracted liquid oil out the system while air passes through the radial holes 330 into the bore 230. As the gear 250 and the bolt-on breather 270 are spinning, the air-oil mixture in the form of oil mist flows into the bolt-on breather 270 through the plurality of radial passageways 240 through outlet openings 320a (FIG. 6). The lighter air is not significantly affected by the centrifugal force and flows to the radial holes 330 on the shaft 220 through inlet openings 320b (FIG. 6) and then exits to the environment via the bore 230 with minimum oil contained in the flowing air. The heavier oil particles are impacted by the centrifugal force to coalesce and/or flow radially outward through the radial passageways 240 and are spun back out of the outlet openings 320a to return to the gearbox 180 (FIG. 1), or bearing sump depending on the application. The air-oil separator system 210 efficiently removes the oil from the air, and is a function of the gearbox pressure, mass flow rate of the air, and the expected oil percentage in the air. In some examples, the gearbox pressure is typically about 5 psi. The illustrated air-oil separator system is just one example, in other examples, other configurations are possible. For example, as the mass flow rate of the air increases, additional passageways 240 may be added to increase the surface areas on the bolt-on breather 270.

A unique feature of the air-oil separator system 210 may be the selection of different materials for the gear shaft and the breather components. The system is designed in such a way to provide significant weight savings for the engine by selecting air-oil separator material that minimizes component weight while meeting component design criteria. For example, the materials used for the shaft 220 may be a high strength and durable material, such as steel, in order to properly support the gears and bearing loads, while the breather components 270 of the air-oil separator system 210 may be lightweight materials with flexibility so as to adopt the geometry of the gear shaft.

The bolt-on breather 270 having the first part 270a and/or the second part 270b can be made of any material that is of equal or lower density than the steel materials used for the gear 250 and the shaft 220, which can withstand operating temperatures in the range from about −50° C. to 200° C. In some examples, the breather 270 having the first part 270a and/or the second part 270b are made of a material selected from, but not limited to, metals or metal alloys, ceramics, polymers, or plastics. Suitable metals or metal alloys may be selected from, but not limited to, steel, aluminum, magnesium, titanium, beryllium and alloys thereof. Suitable ceramics may be selected from the group consisting of alumina, carbide, boride, nitride, and combinations thereof. Suitable polymers may be selected from the group consisting of polyethylene, polypropylene, polyesters, nylon, and cellulose. Suitable plastics are selected from the group consisting of polyamide, polyetheretherketone, polyphenylensulfide, polyimide, polyphenylsulfone, polysulfone, polyethersulfone, polyetetrafluoroethylene, polyetherimide and polyvinylidene fluoride.

The gear shaft components of the air-oil separator system 210 can be made of any high strength steels, preferably, aerospace grade steels. The high strength steels may have a tensile strength higher than 800 MPa, and a yield strength over 500 MPa. In some examples, the gear 250 and the shaft 220 are made of a second material selected from, but not limited to, alloy steels, carbon steels, or stainless steels.

In the examples, the bolt-on breather 270 may be made with aluminum to reduce the gear assembly weight by as much as 40% when compared with gear steel and in other examples, the bolt-on breather 270 may be made with plastic to reduce the gear assembly weight by as much as 70% when compared with gear steel. A plastic breather also has the potential to utilize internal plastic snaps which further reduces the weight of the air-oil separator system 210 by eliminating use of metal bolts.

Another benefit to designing the air-oil separator system 210 using different materials for each of its components comes in the form of damping. Gear 250 containing web 310, defined as the area between the gear teeth and the gear shaft, is susceptible to dynamic natural resonant frequencies that occur within the normal operating speed range of the gearbox. These frequencies can cause premature failure of the gears and either need to be tuned out of the operating range or a damping mechanism employed. Apply a damping coating or incorporate damping rings into the design to dampen the dynamic response of the gear web are possible solutions. Another solution is incorporating a bolt-on breather 270 to provide the desired damping effects without the need to apply a damping coating or damping rings to the gear, which ultimately saves cost and provides additional weight savings for the engine. In some examples, the first part 270a and the second part 270b are each utilized to dampen the dynamic response of the gear web by coupling with the gear web 310 and/or the gear rim 350.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a centrifugal air-oil separator system for separating oil particles from air in a gas turbine engine system. The centrifugal air-oil separator system includes a rotatable shaft journaled within a housing of the gas turbine engine system, the shaft including an axially extending bore formed at least partially through the shaft; a gear integral to or mounted on an outer surface of the shaft and radially extending away from the shaft, the gear includes gear teeth and a gear web; and a breather mounted on the shaft and independent from and in contiguous contact with the gear, wherein the shaft has a plurality of angularly spaced passageways extending radially outward through the shaft from the bore, wherein the breather includes a plurality of radial holes respectively aligned for fluid communication with the plurality of passageways in the shaft.

A second aspect relates to the centrifugal air-oil separator system of the first aspect, wherein the breather includes at least one of a first part or a second part, wherein the at least one of the first part or the second part are mounted on the shaft and in contiguous contact with the gear.

A third aspect relates to the centrifugal air-oil separator system of the first aspect, wherein the breather includes a first part and a second part, wherein the first part and the second part are mounted on the shaft and in contiguous contact with the gear.

A fourth aspect relates to the centrifugal air-oil separator system of the first aspect, wherein the breather includes a first part and a second part, and the first part and the second part are contiguously coupled with the gear by fasteners extending through the first part, the gear, and the second part.

A fifth aspect relates to the centrifugal air-oil separator system of the fourth aspect, wherein the first part and the second part are maintained in contiguous contact with at least one of the gear web, the gear inner shoulder, or the gear rim in opposite directions by the fastener.

A sixth aspect relates to the centrifugal air-oil separator system of the second aspect, further including at least one spanner nut on the shaft, wherein the at least one of the first part or the second part are held against the shaft or gear by compression with the spanner nut.

A seventh aspect relates to the centrifugal air-oil separator system of the second aspect, wherein the at least one of the first part or the second part are press-fit onto the shaft.

An eighth aspect relates to the centrifugal air-oil separator system of the second aspect, further including an O-ring seal between the first part and the shaft, or an O-ring seal between and the second part and the shaft.

A ninth aspect relates to the centrifugal air-oil separator system of the second aspect, wherein the at least one of the first part or the second part are used to dampen a dynamic response of the gear web.

A tenth aspect relates to the centrifugal air-oil separator system of the first aspect, wherein the plurality of radial holes are aligned with the plurality of radial passageways to receive an air-oil mixture from the engine system and provide communication of at least air to the bore.

An eleventh aspect relates to the centrifugal air-oil separator system of the first aspect, wherein the housing is a gearbox housing, and the shaft is a rotatable driven by a gas turbine engine.

A twelfth aspect relates to the centrifugal air-oil separator system of the first aspect, wherein the housing is an oil system housing of a gas turbine engine sump, and the shaft is a rotatable shaft in the gas turbine engine sump.

A thirteenth aspect relates to the centrifugal air-oil separator system of the first aspect, wherein the breather is made of a first material selected from metals or metal alloys, ceramics, polymers, or plastics, and wherein each of the gear and the shaft are made of a second material selected from alloy steels, carbon steels or stainless steels.

A fourteenth aspect relates to the centrifugal air-oil separator system of the thirteenth aspect, wherein the metals or metal alloys are selected from steel, aluminum, magnesium, titanium, beryllium or alloys thereof.

A fifteenth aspect relates to the centrifugal air-oil separator system of the thirteenth aspect, wherein the ceramics are selected from the group consisting of alumina, carbide, boride, nitride, and combinations thereof.

A sixteenth aspect relates to the centrifugal air-oil separator system of the thirteenth aspect, wherein the polymers are selected from the group consisting of polyethylene, polypropylene, polyesters, nylon, and cellulose.

A seventeenth aspect relates to the centrifugal air-oil separator system of the thirteenth aspect, wherein the plastics are selected from the group consisting of polyamide, polyetheretherketone, polyphenylensulfide, polyimide, polyphenylsulfone, polysulfone, polyethersulfone, polyetetrafluoroethylene, polyetherimide and polyvinylidene fluoride.

An eighteenth aspect relates to the centrifugal air-oil separator system of the thirteenth aspect, wherein the first material is equal to or lighter in density than the second material.

A nineteenth aspect relates to the centrifugal air-oil separator system of the second aspect, wherein each of the at least one of the first part or the second part includes a plurality of angularly spaced passageways and the passageways in the at least one of the first part or the second part are formed by a manufacturing method selected from machining, casting, additive layer manufacturing, extrusion, pressing, or injection molding.

A twentieth aspect relates to the centrifugal air-oil separator system of the nineteenth aspect, wherein the breather includes both the first part and the second part, and the passageways in the first part and the passageways in the second part provide fluid communication between the first part and the second part through the gear web.

In addition to the features mentioned in each of the independent aspects enumerated above, some examples may show, alone or in combination, the optional features mentioned in the dependent aspects and/or as disclosed in the description above and shown in the figures.

What is claimed is:

1. A centrifugal air-oil separator system for separating oil particles from air in a gas turbine engine system, comprising:
   a rotatable shaft journaled within a housing of the gas turbine engine system, the rotatable shaft including an axially extending bore formed at least partially through the rotatable shaft;
   a gear integral to or mounted on an outer surface of the rotatable shaft and radially extending away from the rotatable shaft, the gear comprises gear teeth and a gear web; and
   a breather mounted on the rotatable shaft and independent from and in contiguous contact with the gear,
   wherein the rotatable shaft has a plurality of angularly spaced passageways extending radially outward through the rotatable shaft from the axially extending bore, wherein the breather includes a plurality of radial holes respectively aligned for fluid communication with the plurality of angularly spaced passageways in the rotatable shaft,
   wherein the breather comprises a first part and a second part, wherein the first part and the second part are mounted on the rotatable shaft and in contiguous contact with the gear.

2. The centrifugal air-oil separator system of claim 1, wherein the first part and the second part are contiguously coupled with the gear by fasteners extending through the first part, the gear, and the second part.

3. The centrifugal air-oil separator system of claim 2, wherein the first part and the second part are maintained in contiguous contact with at least one of the gear web, a gear inner shoulder, or a gear rim in opposite directions by the fastener.

4. The centrifugal air-oil separator system of claim 1, further comprising at least one spanner nut on the rotatable shaft, wherein the at least one of the first part or the second part are held against the rotatable shaft or gear by compression with the spanner nut.

5. The centrifugal air-oil separator system of claim 1, wherein the at least one of the first part or the second part are press-fit onto the rotatable shaft.

6. The centrifugal air-oil separator system of claim 1, further comprising an O-ring seal between the first part and the rotatable shaft, or an O-ring seal between the second part and the rotatable shaft.

7. The centrifugal air-oil separator system of claim 1, wherein the at least one of the first part or the second part are used to dampen a dynamic response of the gear web.

8. The centrifugal air-oil separator system of claim 1, wherein the plurality of radial holes are aligned with the plurality of radial passageways to receive an air-oil mixture from the gas turbine engine system and provide communication of at least air to the axially extending bore.

9. The centrifugal air-oil separator system of claim 1, wherein the housing is a gearbox housing, and the rotatable shaft is rotatably driven by a gas turbine engine.

10. The centrifugal air-oil separator system of claim 1, wherein the housing is an oil system housing of a gas turbine engine sump, and the rotatable shaft is a rotatable shaft of the gas turbine engine sump.

11. The centrifugal air-oil separator system of claim 1, wherein each of the at least one of the first part or the second part includes a plurality of angularly spaced passageways and the plurality of angularly spaced passageways in the at least one of the first part or the second part are formed by a manufacturing method selected from machining, casting, additive layer manufacturing, extrusion, pressing, or injection molding.

12. The centrifugal air-oil separator system of claim 11, wherein the plurality of angularly spaced passageways in the first part and the plurality of the angularly spaced passageways in the second part provide fluid communication between the first part and the second part through the gear web.

13. A centrifugal air-oil separator system for separating oil particles from air in a gas turbine engine system, comprising:
 a rotatable shaft journaled within a housing of the gas turbine engine system, the rotatable shaft including an axially extending bore formed at least partially through the rotatable shaft;
 a gear integral to or mounted on an outer surface of the rotatable shaft and radially extending away from the rotatable shaft, the gear comprises gear teeth and a gear web; and
 a breather mounted on the rotatable shaft and independent from and in contiguous contact with the gear, the breather including a first part and a second part disposed on opposite side of the gear, the gear disposed axially between the first part and the second part,
 wherein the rotatable shaft has a plurality of angularly spaced passageways extending radially outward through the rotatable shaft from the axially extending bore, wherein the breather includes a plurality of radial holes respectively aligned for fluid communication with the plurality of angularly spaced passageways in the rotatable shaft.

14. The centrifugal air-oil separator system of claim 13, wherein at least one of the first part or the second part are mounted on the rotatable shaft and in contiguous contact with the gear.

15. The centrifugal air-oil separator system of claim 13, wherein the first part and the second part are contiguously coupled with the gear by fasteners extending through the first part, the gear, and the second part.

16. The centrifugal air-oil separator system of claim 15, wherein the first part and the second part are maintained in contiguous contact with at least one of the gear web, a gear inner shoulder, or a gear rim in opposite directions by the fastener.

17. A centrifugal air-oil separator system for separating oil particles from air in a gas turbine engine system, comprising:
 a rotatable shaft journaled within a housing of the gas turbine engine system, the rotatable shaft including an axially extending bore formed at least partially through the rotatable shaft;
 a gear integral to or mounted on an outer surface of the rotatable shaft and radially extending away from the rotatable shaft, the gear comprises gear teeth and a gear web; and
 a breather mounted on the rotatable shaft and independent from and in contiguous contact with the gear, the breather including a first part and a second part disposed on the rotatable shaft,
 wherein the rotatable shaft has a plurality of angularly spaced passageways extending radially outward through the rotatable shaft from the axially extending bore, wherein the first part and the second part of the breather each include a plurality of radial holes respectively aligned for fluid communication with the plurality of angularly spaced passageways in the rotatable shaft.

18. The centrifugal air-oil separator system of claim 17, wherein at least one of the first part or the second part are mounted on the rotatable shaft and in contiguous contact with the gear.

19. The centrifugal air-oil separator system of claim 17, wherein the first part and the second part are contiguously coupled with the gear by fasteners extending through the first part, the gear, and the second part.

* * * * *